Dec. 20, 1966   P. D. JOHNSON ET AL   3,293,493
LIGHT SOURCE FOR COLOR SYNTHESIS
Filed Sept. 25, 1963
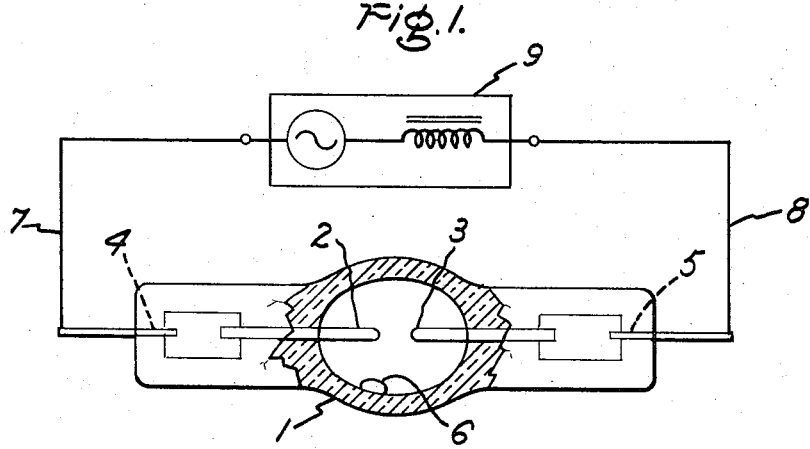
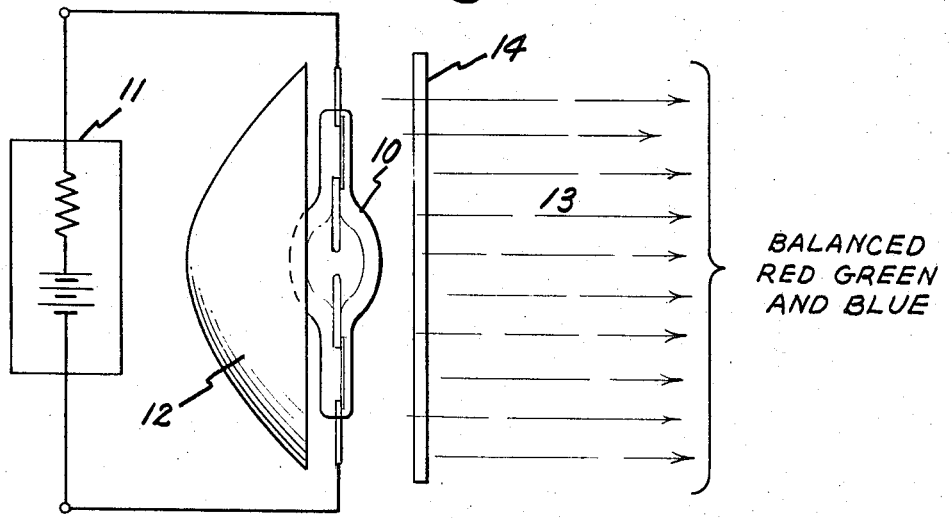
Inventors:
Peter D. Johnson,
James T. La Tourrette,
by John F. Ahern
Their Attorney.

United States Patent Office 3,293,493
Patented Dec. 20, 1966

3,293,493
LIGHT SOURCE FOR COLOR SYNTHESIS
Peter D. Johnson, Schenectady, and James T. La Tourrette, Huntington, N.Y., assignors to General Electric Company, a corporation of New York
Filed Sept. 25, 1963, Ser. No. 311,528
1 Claim. (Cl. 315—358)

The present invention relates to high intensity electric arc lamps and more particularly pertains to such a lamp capable of providing an efficient source for color synthesis.

Most light sources are used for color reproduction. For such use it is normally important that the light source provide substantially uniform emission throughout the visible light spectrum. For example, an article of wearing apparel which appears bright in sunlight would appear dull or even black if its characteristic color fell within a gap in the spectrum of an artificial light source which was the sole means of illumination. In the past, various elements have been added to otherwise deficient light sources to produce more uniform emission.

In contradistinction to color reproduction, the present invention pertains to color synthesis, and more particularly to a high intensity light source for this purpose. For light synthesis it is not only unnecessary, but frequently undesirable, to provide a source of light having an emission which is substantially undiminished throughout the entire visible electromagnetic spectrum. This is because, in many color synthesis systems, the image is formed by controlling the relative intensities of three primary colors. Examples of such color synthesis systems include the recently discovered light-valve systems.

Three primary colors can be derived from a light source which emits continuously throughout the visible electromagnetic spectrum by providing a plurality of filters. A plurality of filters also act to diminish the light intensity to such an extent that high intensity light is no longer available from the source. This is because all known practical filters diminish to some extent emission over the entire visible light spectrum.

In almost all high intensity light applications the diminution of luminous intensity attending use of only a single filter may be tolerated. For this reason there are a plurality of color synthesis systems wherein three light beams are provided, usually by three light sources or by splitting the beam from a single source by optical means into three beams, and a single filter in each light path is used to derive the respective primary colors. Systems using three light sources are prohibitorily expensive for many desirable commercial applications as are those systems using complex optical beam-splitting arrangements. For this reason, among others, it would be highly desirable to provide a single high intensity light source capable of producing concentrated light emission in three bands of the visible spectrum corresponding to three primary colors without requiring more than a single filter.

The three colors most advantageously used for color synthesis are red, green and blue. These are the three primary stimuli recommended by the Optical Society of America when considering color as a psychophysical stimulus and have been so recognized by the International Commision of Illumination (I.C.I.).

Accordingly, it is a primary object of our invention to provide an efficient high intensity light source having strong emission in the red, green and blue color portions of the visible light electromagnetic spectrum.

It is another object of our invention to provide an efficient high intensity light source having substantially balanced luminous intensity of red, green and blue when used in conjunction with only a single filter.

Briefly, in accordance with the present invention a high intensity light source radiating predominantly red, green and blue light is provided by providing a metallic vapor arc lamp in which the metallic vapor is composed essentially of mercury, zinc and thallium. The lamp electrode spacing is preferably in the range from one millimeter to five millimeters and mercury is present to the extent of about 30 milligrams for each cubic centimeter (cc.) of envelope volume. The lamp is heated by supplying sufficient electrical energy to its electrodes to sustain an inner wall temperature in the range from 750° to 850° C. Both zinc and thallium are present in sufficient quantity to provide full partial pressures thereof at this operating temperature. Improved balance between the red, green and blue light outputs is achieved, if desired, by providing a glass having neodymium therein as a filter to remove the yellow lines of mercury.

The novel features of our invention which we believe characteristic are set forth with particularity in the appended claims. Our invention itself, however, both as to its organization and method of operation, together with further objects and advantages thereof, may best be understood by reference to the following description taken in connection with the accompanying drawing in which:

FIGURE 1 is a diagrammatic illustration of a lamp suitable for use in accordance with the present invention; and, FIGURE 2 illustrates a color synthesis system in accordance with the present invention.

The high intensity light source of FIGURE 1 is shown diagrammatically in cross section as comprising a hermetically sealed light-transmissive envelope 1 which may conveniently be constituted of fused quartz. A pair of arc electrodes 2 and 3, conveniently constituted of conducting refractory metal, such as tungsten, extend through the walls of envelope 1 at points 4 and 5, respectively. Alternatively, electrodes 2 and 3 may be supported at the inner ends of conductors which extend through envelope 1. Normally it is desirable to provide a thin metal ribbon of suitable material, such as molybdenum, as a sealing link at this point of passage through the envelope wall, as is well-known in the art.

It is generally desirable to provide as concentrated a high intensity light source as possible so as to approximate a point light source. To this end electrodes 2 and 3 define a small arc gap preferably having a spacing in the range from one millimeter to five millimeters. In such event, the inside diameter of envelope 1, measured perpendicularly to electrodes 2 and 3, may be in the order of 8 millimeters and the inside volume of envelope 1 may be about one cc.

In accordance with the present invention there is provided a metallic filling or charge 6 constituted of mercury, zinc and thallium. We have discovered that the optimum quantity of mercury within envelope 1 is an amount weighing 25 to 50, preferably about 30, milligrams for each cc. of volume inside envelope 1. With this quantity all of the mercury is vaporized during normal operation of the light source. Lesser amounts of mercury result in excessive heating of arc electrodes 2 and 3 and a reduced amount of energy reaches the arc, or plasma, formed between the electrodes. For purposes of light production, it is desirable that electrode heating be minimized and plasma heating be maximized. When mercury is present in a quantity substantially exceeding 50 milligrams for each cc. of envelope volume, the pressure within envelope 1 during normal operation becomes excessive and the danger of fracturing envelope 1 is present. To this end, the quantity of mercury should not exceed 100 milligrams for each cc. of envelope volume. The zinc and thallium are present in sufficient quantity to provide full partial pressures thereof when the inner wall of envelope 1 is heated to a temperature of about 800° C. This means that at least some finite amounts of the zinc and thallium are not in the vapor state during normal operation.

Preferably, the lamps of the present invention contain a suitable filling of inert gas which may be constituted of the noble gases such as helium, neon, krypton, xenon or argon. The latter, at a pressure of 20 millimeters of mercury when the lamp is at room temperature, has been found to be particularly effective.

Suitable conductive means 7 and 8 connect arc electrodes 2 and 3, respectively, to a suitable source 9 of electrical energy which includes an arc-stabilizing ballast as illustrated. Source 9 may be an alternating current source, as shown, or a direct current source. In the latter event the ballast is a resistor rather than an inductance. In the event that the lamp is to be used for projection purposes, it is generally preferable to provide a direct current source to avoid intermittent illumination which may be intensified in its undesirable manifestations by intermittent movement of the motion picture film.

Source 9 is adjusted to provide sufficient energy to the lamp to provide an operating temperature of the inner wall thereof in the order of from 750° C. to 850° C. With the lamps of the general type to which this invention pertains this requires an average current flowing between arc electrodes 2 and 3 of approximately 9 amperes when an outer envelope (not shown), which may conveniently be constituted of "Pyrex" glass, is used to reduce heat loss from the lamp envelope.

FIGURE 2 illustrates a system, in accordance with the present invention, which provides a high intensity luminous output having substantially balanced luminous intensity in the red, green and blue regions of the visible light spectrum. The system includes a lamp 10 of the general type shown in FIGURE 1 and a power supply 11 connected thereto for operation as described above. Lamp 10 is disposed at the focal point of a parabolic reflector which reflects and concentrates the light output of lamp 10, as is well-known in the art. In accordance with the present invention a "Didymium Glass" (a glass having neodymium therein) filter 14 is disposed in light path 13 to remove the yellow lines of mercury and provide a substantially balanced red, green and blue luminous output. It is to be understood that FIGURE 2 is merely illustrative of our invention and that in actual practice it is frequently desirable to join reflector 12 and filter 14 along their outer peripheral edges to provide additionally a sealed outer envelope which reduces heat loss from lamp 10. Alternatively, reflector 12 may be omitted and an outer bulb provided which is constituted of suitable heat-resistant glass having neodymium therein.

By way of illustration, a light source, such as shown in FIGURE 1, was constructed having an electrode separation of three millimeters and an inside diameter, measured perpendicularly to the electrodes, of eight millimeters. The volume inside the envelope was about one cc. The walls of envelope 1 were two millimeters thick and were constituted of fused quartz. A charge containing 30 milligrams of mercury, 15 milligrams of zinc and one milligram of thallium was used. After the charge was introduced, the envelope was evacuated and filled with argon at a pressure of 20 millimeters of mercury and sealed-off by means well-known in the art. Thereafter, the envelope was positioned inside an outer envelope constituted of "Pyrex" glass. A power supply having a current output of about 9 amperes supplied 350 watts to the lamp through its electrodes. The luminous efficiency measured was high, being about 34 lumens per watt. Thus, the lamp provided in excess of 10,000 lumens of total light output. The I.C.I. coordinates for red, green, and blue were 305, 311 and 380, respectively. With a neodymium glass filter (Corning filter No. 5120), used in a system as shown in FIGURE 2, the foregoing lamp had a total luminous output which was cut substantially in half to about 5,000 lumens. Thus, the source still provided high intensity illumination. The undesirable yellow luminous output resulting from the mercury was, however, reduced in intensity by more than 60 times. Color stability was excellent, owing in large part to the use of the relatively non-reactive elemental zinc and thallium.

Though it was not possible, as a practical matter, to measure the I.C.I. coordinates for the lamp used with the filter, the spectral output was measured and discovered to provide substantially balanced red, green and blue light output to the substantial exclusion of other colors. The relative intensities of red, green and blue were 260, 218 and 298, respectively, while that of yellow was 6. Tests with lamps from which thallium was omitted showed that the color balance was still good, though not the optimum achieved when it was included.

The relative intensities of red, green and blue can be varied to some extent by varying the quantity of mercury in the lamp. For example, an increase in the quantity of mercury enhances the zinc and thallium characteristic spectral emissions and decreases the mercury spectrum. This is because more energy is delivered to the plasma resulting in a higher temperature of the envelope inner wall, which, in turn, results in an increased vapor pressure of zinc and thallium. The mercury spectrum is suppressed concommittantly. Also, for a given enclosed lamp volume, it is generally desirable to provide a slightly lesser quantity of mercury when the electrode spacing is increased and vice versa.

While we have shown and described our invention with respect to an illustrative embodiment thereof many modifications and variations will occur to those skilled in the art. For example, the neodymium glass filter could advantageously be provided directly on the surface of the lamp or neodymium could be introduced into an outer envelope of the lamp without departing from the invention. Accordingly, it is intended by the appended claims to include these and other variations and modifications which will suggest themselves to those skilled in the art and do not depart from the scope of the present invention.

What we claim as new and desire to secure by Letters Patent of the United States is:

A high intensity light source for color synthesis, said source comprising:
 (a) an hermetically sealed light-transmissive envelope containing a noble gas atmosphere;
 (b) a pair of arc electrodes positioned in said envelope and defining an arc gap therein having a spacing in the range from 1 millimeter to 5 millimeters;
 (c) a charge of mercury in said envelope weighing about 30 milligrams for each cubic centimeter of volume enclosed by said envelope;
 (d) a quantity of zinc in said envelope being sufficient to provide the maximum partial pressure of zinc vapor corresponding to operating temperatures; and a quantity of thallium in said envelope sufficient to provide the maximum partial pressure of thallium vapor corresponding to operating temperature; and (e) a source of electrical power connected to said electrodes, said source supplying sufficient electrical energy to said electrodes to provide an inner wall operating temperature of said envelope in the range from 750° C. to 850° C.

References Cited by the Examiner

UNITED STATES PATENTS

| | | | |
|---|---|---|---|
| 1,990,205 | 2/1935 | Reger | 313—225 X |
| 2,009,202 | 7/1935 | Pirani et al. | 313—225 X |
| 2,103,041 | 12/1937 | Rompe et al. | 313—314 X |
| 2,215,648 | 9/1940 | Marden et al. | 313—229 X |
| 2,228,327 | 1/1941 | Spanner | 313—229 X |
| 2,240,353 | 4/1941 | Schnetzler | 313—183 X |
| 2,467,687 | 4/1949 | Noel | 313—229 X |
| 2,650,322 | 8/1953 | Francis et al. | 313—229 X |
| 2,659,833 | 11/1953 | Anderson | 313—229 X |

OTHER REFERENCES

Cushing, W. V., et al., "Higher Efficiency Light Source Through Use of Additives to the Mercury Discharge," September 1962 issue of "Illuminating Engineering," pp. 593–594, comprising an abstract of I.E.S. Conference Paper No. 29.

JOHN W. HUCKERT, *Primary Examiner.*

A. M. LESNIAK, *Assistant Examiner.*